United States Patent [19]

Hämmerle

[11] Patent Number: 5,248,985
[45] Date of Patent: Sep. 28, 1993

[54] HIGH FREQUENCY FINDER FOR AUTOMOTIVE VEHICLES

[75] Inventor: Richard Hämmerle, Kirchheim, Fed. Rep. of Germany

[73] Assignee: Rohde & Schwarz GmbH & Co. KG, Fed. Rep. of Germany

[21] Appl. No.: 982,443

[22] Filed: Nov. 27, 1992

[30] Foreign Application Priority Data

Dec. 4, 1991 [DE] Fed. Rep. of Germany ..... 91120809

[51] Int. Cl.⁵ .......................................... G01S 3/02
[52] U.S. Cl. ................................... 342/457; 343/712
[58] Field of Search ............... 342/357, 457; 343/712, 343/713

[56] References Cited

U.S. PATENT DOCUMENTS

| | | |
|---|---|---|
| 3,879,733 | 4/1975 | Hansen et al. |
| 4,003,057 | 1/1977 | Luedtke et al. |
| 4,288,794 | 9/1981 | Osborne et al. |
| 4,553,145 | 11/1985 | Evans |
| 4,754,282 | 6/1988 | Edelblute et al. |
| 4,811,330 | 3/1989 | Ohe et al. ............... 343/712 |
| 4,949,268 | 8/1990 | Nishikawa et al. ............ 364/449 |
| 4,972,431 | 11/1990 | Keegan ............... 342/357 |

FOREIGN PATENT DOCUMENTS

| | | |
|---|---|---|
| 0363619 | 8/1990 | European Pat. Off. |
| 1516876 | 7/1969 | Fed. Rep. of Germany |
| 2007049 | 8/1971 | Fed. Rep. of Germany |
| 2525485 | 12/1976 | Fed. Rep. of Germany |

OTHER PUBLICATIONS

"A New Approach to the Problem of HF Vehicular Radio Direction Fingding" Technology for Communications International, Dec. 1972, pp. 73-76.

"Automated Calibration Technique for a Phased Array Antenna" by W. G. Bailey et al, Proceedings from the 22nd International Instrumentation Symposium, San Diego, Calif., May 25-27, 1976, pp. 563-568.

"Das Einkanalpeilsystem EP 1650 mit Peilzusatz fur den Frequenzbereich 20 bis 1000 MHz", by Ralf Esprester et al. Techn. Mitt. AEG-Telefunken 68 (1978), pp. 149-152.

"Zwei neue mobile Peiler zur Funkerfassumg" by B. F. Ernst, Neues von Rohde & Schwarz 95 (1981), pp. 32-33.

"Direction Finding Using Correlation Techniques", by N. Saucier et al, Sanders, Assoc., Inc., pp. 1-7.

"Mobiler HF-Peiler PA 510" Rohde & Schwarz, pp. 1-6.

*Primary Examiner*—Theodore M. Blum
*Attorney, Agent, or Firm*—Hill, Steadman & Simpson

[57] ABSTRACT

In a high frequency direction finder for automotive vehicles, complex measured voltages are obtained from a plurality of antennas. Measured data sets are derived from the measured voltages from which the direction of arrival of a high frequency transmitter to be located is determined by comparison with model data sets obtained by taking into account the vehicle structure using a previously conducted calibration process. The antennas are mounted in the immediate vicinity of the vehicle body so as to be concealed from the outside. The analog received signals from the antennas are digitized and the signal to noise ratio of these digitized received signals is improved by spectral analysis. Both of the measured data sets and model data sets are obtained from received signals that have been digitized and improved by spectral analysis.

18 Claims, 2 Drawing Sheets

HIGH FREQUENCY FINDER FOR AUTOMOTIVE VEHICLES

BACKGROUND OF THE INVENTION

The present invention is directed to a high frequency (HF) direction finder for automobiles.

A prior art direction finder is disclosed in European Patent Application No. 0,363,619. It is not possible for the antennas of this prior art direction finder to be mounted in the immediate vicinity of the surface structure of the vehicle so as to be completely concealed. When the antennas are mounted near the surface, the signal to noise ratio (S/N) at the output of the antennas becomes too low to obtain a perfect bearing. Therefore, the antennas of the prior art direction finder must be mounted more or less visibly in areas which are free from the metal body of the vehicle. For example, in U.S. Pat. No. 4,003,057 thin antenna wires are stretched across the rear window of the vehicle for use as antennas. However, this does not make the antenna completely invisible. An automotive vehicle equipped with such a HF direction finder is not optimally suited for tracking and observing objects or vehicles marked with a target transmitter, because by using these antennas a tracked person will readily recognize that he is being followed by a vehicle.

SUMMARY OF THE INVENTION

It is an object of the present invention to provide a HF direction finder for tracking automotive vehicles, in which the antennas are mounted on the vehicle so as to be completely concealed.

In general terms the present invention is a high frequency direction finder for automotive vehicles in which by way of a plurality of antennas complex measured voltages are obtained and measured data sets are obtained therefrom, from which the direction of arrival of signals of a high frequency transmitter to be located is determined by comparison with model data sets obtained by taking into account the vehicle structure by way of a previously conducted calibration operation. The antennas are mounted in the immediate vicinity of the vehicle body so as to be concealed from outside the vehicle. The analog received signals from the antennas are digitized and the signal to noise ratio of the digital received signals is improved by spectral analysis. The measured and model data sets are obtained from these received signals.

The following are advantageous developments of the present invention. The antennas are formed by conductor strips which are disposed at a small distance from the surface of the vehicle body and which together with the body surface form a loop antenna.

A base amplifier is integrally provided at the free end of the conductor strip.

The digitized input signals are subjected to fast fourier transform processing or discrete fourier transform processing so as to improve their signal to noise ratio.

The model data sets for different directions of arrival are obtained and stored in a single calibration operation using a high frequency calibration transmitter that has a known location.

With the HF direction finder of the present invention it is possible to mount the antennas so as to be completely concealed in the vehicle interior close to the metal body and behind the inside lining. The resulting normally poor S/N ratio of the output voltages of these antennas is substantially improved by the subsequent processing of the received signals by means of a spectral analysis method so that the received digital signals having the improved S/N ratio may subsequently be analyzed in accordance with a known pattern recognition method with no risk of erroneous bearings. Any of the commonly used spectral analysis methods that are used for other purposes in digital HF receivers may be used to improve the S/N ratio. The known Fast Fourier Transform (FFT) or Discrete Fourier Transform (DFT) processes as described in detail, for example, in the journal Frequenz 25 (1971) 9, pp. 267, 268 and 273-278, may be used to particular advantage. Taking the received signals of the individual antennas, which have been digitized by analog-to-digital (A/D) conversion, FFT processing is used for example for filtering out from the overall spectrum the received signal in the vicinity of which only a low level of noise power remains as a spurious signal. The improvement in the S/N ratio depends on the FFT sampling time. The longer the sampling time the narrower the sampling values become in the frequency range and the better the S/N ratio of the received signal becomes. The magnitude of the possible sampling time depends on the duration of the received signals. Since in most of the target transmitters to be tracked, which are mounted on a vehicle that is to be tracked and which are to be tracked by the direction finder of the present invention, pulsed signals of only short duration are transmitted, the possible improvement of the S/N ratio by the signal duration is limited. However, it suffices for practical purposes to improve the S/N ratio to such an extent as to permit a subsequent perfect bearing evaluation.

As mentioned above, the direction finder of the present invention permits the antennas to be mounted in concealed fashion and very close to the surface of the vehicle body. Particularly suitable antennas are so-called loop antennas where only a narrow metal strip is positioned at a small distance of only a few millimeters approximately parallel to the surface of the metal body of the vehicle, for example on one of the window posts of the vehicle, the narrow metal strip together with the opposed metal surface of the vehicle forming a common loop antenna at the base of which an amplifier may be integrally mounted. Although this loop antenna has a poor S/N ratio due to the close proximity of its one loop branch to the metallic vehicle body, this ratio can be improved by subsequent processing.

BRIEF DESCRIPTION OF THE DRAWINGS

The features of the present invention which are believed to be novel, are set forth with particularity in the appended claims. The invention. together with further objects and advantages, may best be understood by reference to the following description taken in conjunction with the accompanying drawings, in the several Figures in which like reference numerals identify like elements, and in which:

DESCRIPTION OF THE PREFERRED EMBODIMENTS

Figure 1:
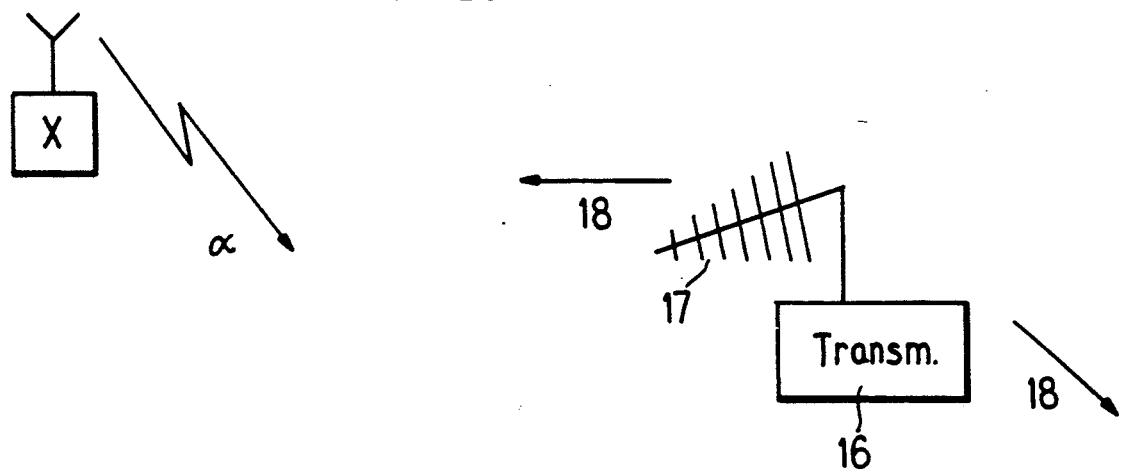
FIG. 1 illustrates the basic design of a direction finder according to the present invention which is mounted in an automotive vehicle, and also illustrates details of the calibration process for determining the model data sets.
Figure 1:
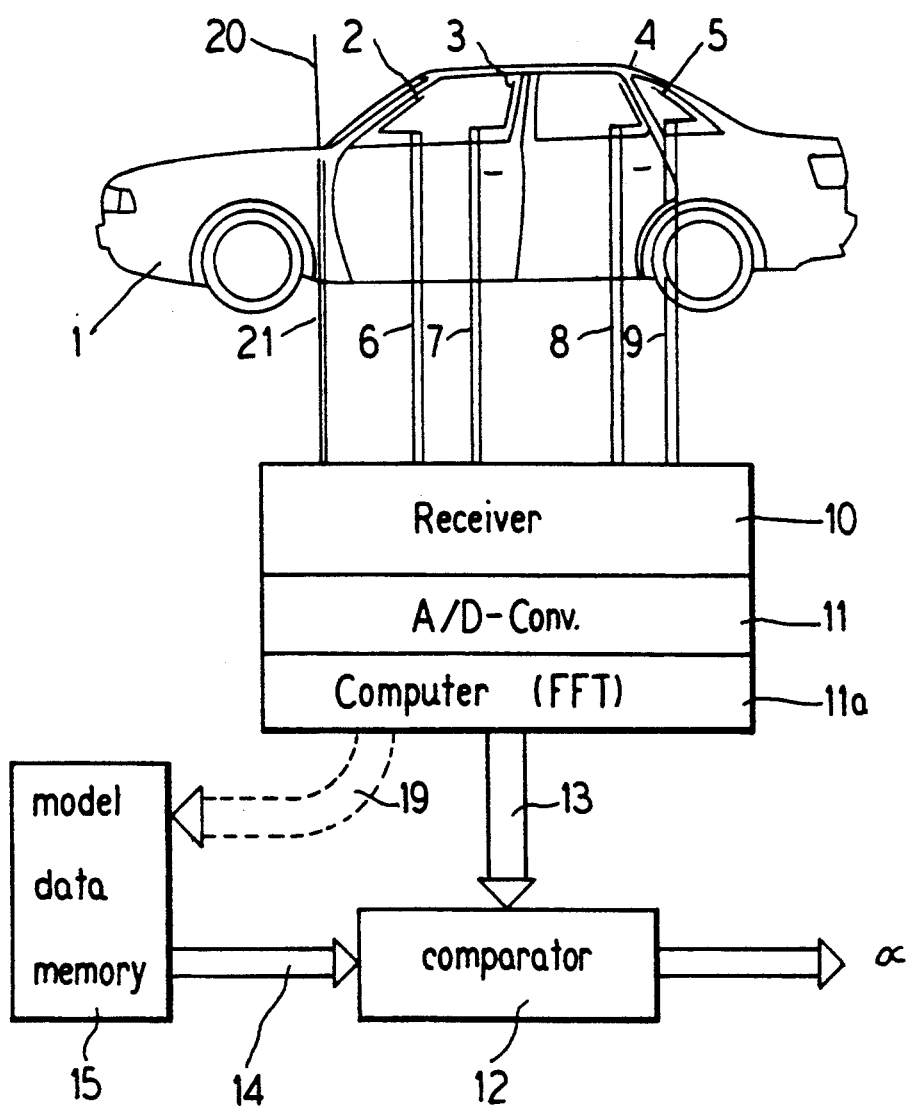
Figure 2:
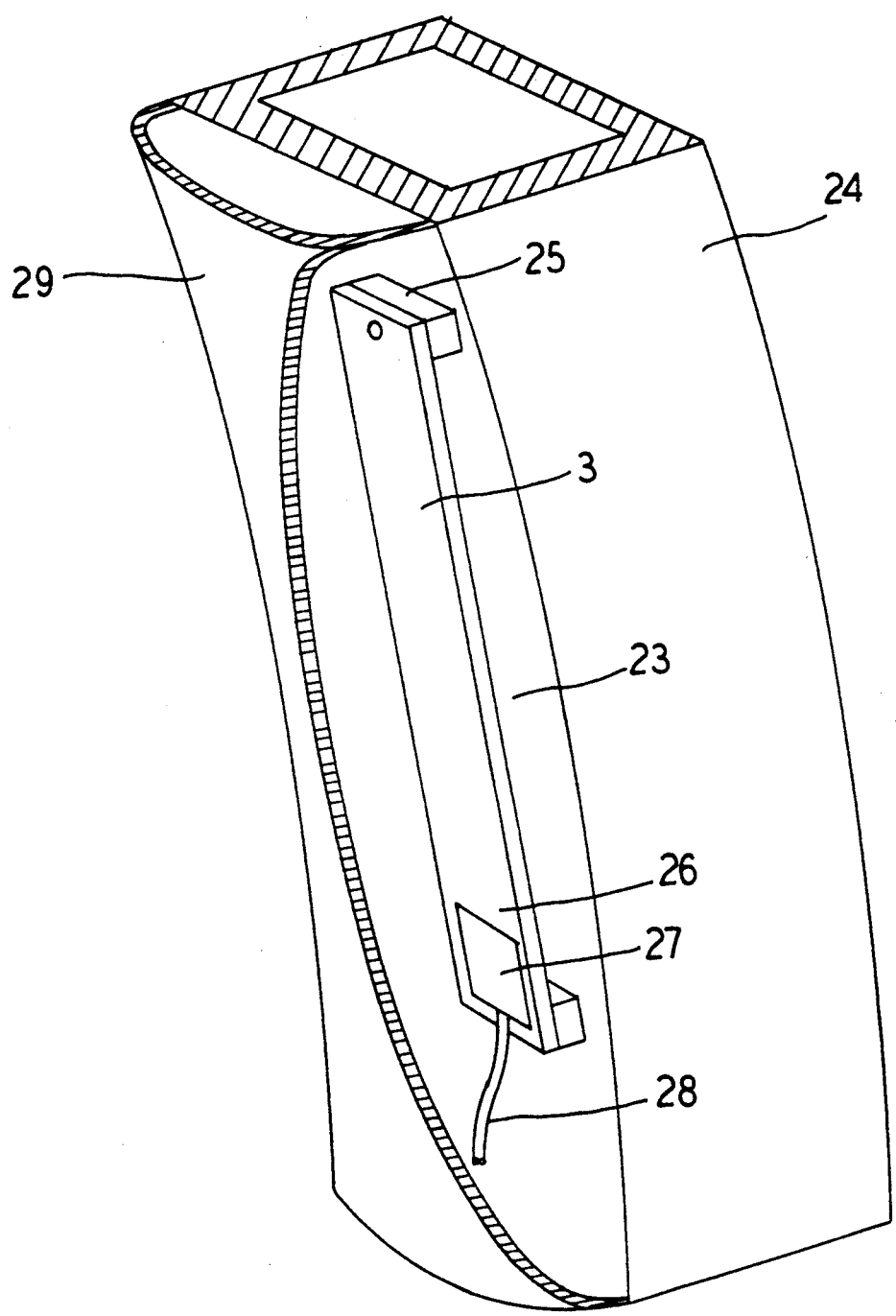
FIG. 2 illustrates details of an antenna used in the FIG. 1 design.

FIG. 1 shows a common automotive vehicle 1 including a built-in HF direction finder of the present invention having a plurality of antennas 2 to 5, which are mounted in the vehicle interior so as to be completely concealed from the outside, a visible reference antenna 20 and the actual direction finder, which may be installed for example in the trunk. With an automotive vehicle 1 thus equipped it is possible, for example, to determine the direction of arrival α of signals from a HF transmitter X which may be mounted as a target transmitter on a vehicle to be tracked. In one embodiment of the present invention four antennas 2, 3, 4 and 5 are mounted in the vehicle interior with an approximately square configuration. Each of the antennas is preferentially designed as a loop antenna. FIG. 2 shows details of these loop antennas by using antenna 3 as an example. Antenna 3 is a narrow conductor strip disposed at a distance of only a few millimeters above the surface 23 of the center post 24 of the vehicle 1. The top end of the conductor strip 3 is electrically connected to the surface 23 of the metal post 24 by a connecting means 25. The bottom end 26 is connected by a base amplifier 27 to the center conductor of a coaxial cable 28, an outer conductor of which is electrically connected to the surface 23. In this way a common loop antenna is formed by the conductor strip 3 and the conductor surface 23 opposite thereto. Although the loop area is small because of the slight spacing, the antenna may be installed in fully concealed fashion behind the inside lining 29, which is shown partly broken away in FIG. 2.

These individual loop antennas 2, 3, 4 and 5, which are mounted behind the inside lining of the vehicle interior so as to be completely invisible, are connected by coaxial cables 6, 7, 8 and 9 to the input terminals of a multichannel HF receiver 10. The reference antenna 20 of the direction finder system which is camouflaged as a common car radio antenna is connected to the receiver 10 by a coaxial cable 21. In the receiver 10, the analog signals from a transmitter X to be located, which are received at the discrete antennas 2, 3, 4, 5 and 20, are converted to a lower intermediate frequency (IF). These IF signals are subsequently converted in an A/D converter 11 to corresponding digital values which are then subjected to spectral analysis in a computer 11a in order to improve the S/N ratio of these discrete received signals. The received digital signals from the antennas 2 to 5 are, for example, subjected to FFT processing whereby the S/N ratio of the received signals from the antennas is improved. Another possible processing by spectral analysis is to initially subject to FFT processing only the signal received from the reference antenna 20 and thereby to accurately determine the frequency of the signal received from the transmitter X. At this determined frequency it is subsequently possible to rapidly perform DFT processing on the received signals from the antennas 2 to 5.

The input signals having a S/N ratio that has been improved by spectral analysis are then analyzed in a computer with regards to magnitude and phase. The resulting complex values of the received signals are correlated with the reference signal from the reference antenna 20. The resulting digital values 13 are then fed to a comparator 12 in which these sets 13 of measured data obtained for locating an unknown transmitter X are compared with model data sets 13 stored in a model data memory 15. The sought after direction of arrival α of signals from the unknown transmitter X is then determined by a comparison of the measured data sets 13 with the model data sets 14 in the comparator 12.

The model data sets 14 stored in the memory 15 are obtained by a previous calibration operation by means of a calibration transmitter 16 which emits a HF calibration signal with its antenna 17. The frequency of the HF calibration signal may be adjusted in the transmitter 16.

The transmitter 16 may be moved around the vehicle in the direction of the two arrows 18. During calibration the transmitter 16 is moved around the vehicle 1, and a model data set 19 is obtained for any direction of arrival similar to the previously described actual directional finder operation from the signals received by the antennas 2 to 5 and 20. This model data set is inputted directly into the model data memory 15 during the calibration operation from the spectral analysis computer 11a and is stored in this memory 15. Hence, the improvement of the S/N ratio by spectral analysis as provided by the present invention is also used when the model data sets are obtained.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A high frequency direction finder for an automotive vehicle having a plurality of antennas from which complex measured voltages are obtained, measured data sets being obtained from the measured voltages, and the direction of arrival of signals from a high frequency transmitter to be located being determined by comparison of the measured data sets with model data sets obtained by taking into account a structure of the vehicle in a previously conducted calibration operation, comprising: the antennas mounted in respective immediate vicinities of a body of the vehicle so that the antennas are completely concealed from outside the vehicle, analog received signals from said antennas being digitized and a signal to noise ratio of said digitized received signals being improved by spectral analysis, and each of said measured and model data sets being obtained from received signals that are digitized and improved by spectral analysis.

2. The high frequency direction finder as claimed in claim 1, wherein each of the antennas are formed by a conductor strip which is positioned at a small distance from a surface of the body of the vehicle and which together with said body surface forms a loop antenna.

3. The high frequency direction finder as claimed in claim 2, wherein a base amplifier is integrally provided at one end of the conductor strip.

4. The high frequency direction finder as claimed in claim 1, wherein the digitized input signals are subjected to Fast Fourier Transform processing so as to improve the signal to noise ratio of the input signals.

5. The high frequency direction finder as claimed in claim 1, wherein the model data sets for different directions of arrival of signals from a high frequency transmitter are obtained and stored in a single calibration operation using a high frequency calibration transmitter of known location.

6. The high frequency direction finder as claimed in claim 1, wherein the digitized input signals are subjected to Discrete Fourier Transform processing so as to improve the signal to noise ratio of the input signals.

7. A high frequency direction finder for an automotive vehicle having a plurality of antennas for receiving analog signals from which complex measured voltages are obtained, measured data sets being obtained from the measured voltages, and the direction of arrival of the analog signals from a high frequency transmitter to be located being determined by comparison of the measured data sets with model data sets obtained by taking into account a structure of the vehicle in a previously conducted calibration operation, comprising: the antennas mounted in respective immediate vicinities of a body of the vehicle so that the antennas are completely concealed from outside the vehicle, the received analog signals from said antennas being digitized and a signal to noise ratio of the digitized received signals being improved by spectral analysis, each of said measured and model data sets being obtained from received signals that are digitized and improved by spectral analysis, each of the antennas being formed by a conductor strip which is at a predetermined distance from a metal body surface of the body of the vehicle, the conductor strip together with said metal body surface forming a loop antenna.

8. The high frequency direction finder as claimed in claim 7, wherein a base amplifier is integrally provided at one end of the conductor strip.

9. The high frequency direction finder as claimed in claim 7, wherein the digitized input signals are subjected to Fast Fourier Transform processing so as to improve the signal to noise ration of the input signals.

10. The high frequency direction finder as claimed in claim 7, wherein the model data sets for different directions of arrival of signals from a high frequency transmitter are obtained and stored in a single calibration operation using a high frequency calibration transmitter of known location.

11. The high frequency direction finder as claimed in claim 7, wherein the digitized input signals are subjected to Discrete Fourier Transform processing so as to improve the signal to noise ration of the input signals.

12. A high frequency direction finder for an automotive vehicle having antennas from receiving analog signals from which complex measured voltages are obtained, measured data sets being obtained from the measured voltages, and the direction of arrival of the analog signals from a high frequency transmitter to be located being determined by comparison of the measured data sets with model data sets obtained by taking into account a structure of the vehicle in a previously conducted calibration operation, comprising: at least four antennas mounted in substantially spaced respective areas of a body of the vehicle so that the antennas are completely concealed from outside the vehicle, the received analog signals from said antennas being digitized and a signal to noise ratio of the digitized received signals being improved by spectral analysis, and each of said measured and model data sets being obtained from received signals that are digitized and improved by spectral analysis, each of the antennas being formed by a narrow conductor strip which is spaced a predetermined distance from a metal body surface of the body of the vehicle, the narrow conductor strip together with said metal body surface forming a loop antenna, a base amplifier being integrally provided at one end of the narrow conductor strip, the other end of the narrow conductor strip being electrically connected to said metal body surface.

13. The high frequency direction finder as claimed in claim 12, wherein the digitized input signals are subjected to Fast Fourier Transform processing so as to improve the signal to noise ratio of the input signals.

14. The high frequency direction finder as claimed in claim 12, wherein the model data sets for different directions of arrival of signals from a high frequency transmitter are obtained and stored in a single calibration operation using a high frequency calibration transmitter of known location.

15. The high frequency direction finder as claimed in claim 12, wherein each antenna is mounted behind an inside lining of an interior of the vehicle so that each antenna is completely concealed.

16. The high frequency direction finder as claimed in claim 12, wherein the antennas are arranged in the vehicle at approximately the corners of a square configuration.

17. The high frequency direction finder as claimed in claim 12, wherein a conductive strip of each antenna is spaced from a respective metal body surface by only a few millimeters.

18. The high frequency direction finder as claimed in claim 12, wherein the digitized input signals are subjected to Discrete Fourier Transform processing so as to improve the signal to noise ratio of the input signals.

* * * * *